R. E. FARMER.
COFFEE PERCOLATOR.
APPLICATION FILED MAR. 31, 1921.
1,389,298.
Patented Aug. 30, 1921.
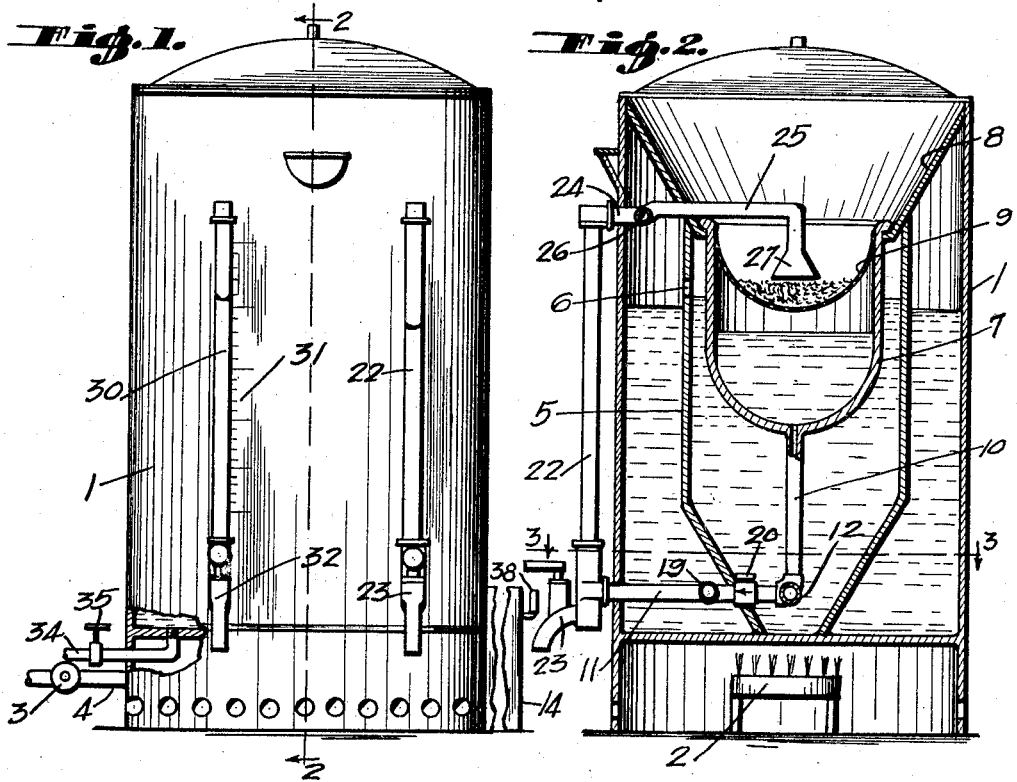
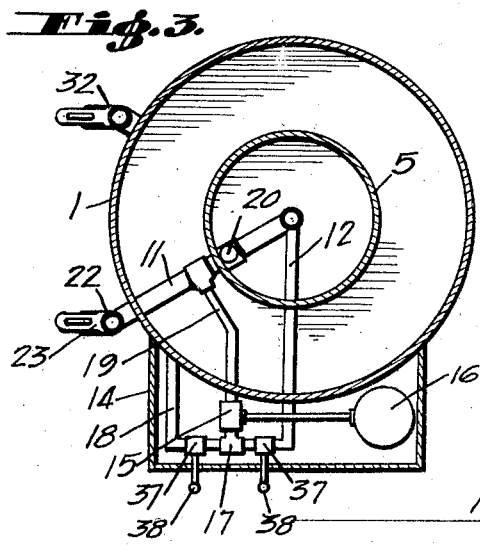
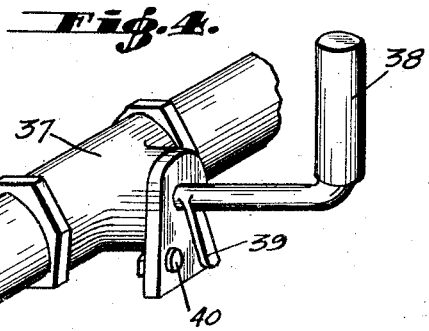
Roy E. Farmer
INVENTOR.
BY *Hazard & Miller*
ATTORNEYS.

UNITED STATES PATENT OFFICE.

ROY E. FARMER, OF LOS ANGELES, CALIFORNIA.

COFFEE-PERCOLATOR.

1,389,298.  Specification of Letters Patent.  Patented Aug. 30, 1921.

Application filed March 31, 1921. Serial No. 457,335.

*To all whom it may concern:*

Be it known that I, ROY E. FARMER, a citizen of the United States, residing at Los Angeles, in the county of Los Angeles and State of California, have invented new and useful Improvements in Coffee-Percolators, of which the following is a specification.

This invention is a percolator for coffee and the like which is so constructed as to provide a circulation through the percolator by a suitable pump.

Further objects of the invention will be readily understood from the following description of the accompanying drawings, in which—

Figure 1 is a front elevation of a percolator constructed in accordance with the invention.

Fig. 2 is a longitudinal section on the line 2—2 of Fig. 1.

Fig. 3 is a transverse section on the line 3—3 of Fig. 2.

Fig. 4 is a perspective view showing one of the valvular controlling means for the percolator.

The percolator may include the usual outer chamber 1 adapted to contain water and having a suitable burner 2 beneath the same. The burner may be controlled by a usual valve 3 arranged in the fuel pipe 4 leading to the burner. An inner chamber 5 is received within chamber 1 in spaced relation from the walls thereof, and said chambers communicate at their upper portions as shown at 6, so that a water level will be maintained in both of said chambers. A usual coffee receptacle 7, which may be a stone jar, is suspended within chamber 5 as by a usual supporting means 8 depending from outer chamber 1. The coffee receptacle is arranged to receive a usual bag of coffee as shown at 9.

The circulating system for the percolator includes a discharge pipe 10 depending from receptacle 7 and extending to the bottom of chamber 5. This pipe has one branch thereof extending outside of chamber 1 and to the front of the percolator as shown at 11, and another branch 12 extending outside of chamber 1 and at one side of the percolator. A casing 14 is arranged upon the percolator over the projecting end of pipe 12, and a suitable pump 15 is arranged within this casing with a suitable electric motor 16 also provided within the casing for operating the pump. The pump is provided with an inlet T 17 having one branch thereof connected to pipe 12 and the other branch connected to a pipe 18 extending into water chamber 1. The discharge pipe 19 for the pump is connected to pipe 11, and a check valve 20 opening in the direction of the outer end of pipe 11, is arranged in the latter between the connection of the same with discharge pipe 19 and the pipe 10.

Pipe 11 communicates with a sight gage 22 upon the exterior of the percolator, and a usual faucet 23 for withdrawing coffee is arranged at the base of this sight gage. The upper end of the sight gage is connected to a pipe 24 extending within outer chamber 1. This pipe has a pipe 25 swiveled to the same as shown at 26, so that the end of the pipe may be swung up and down, and said pipe end is arranged as a usual spray nozzle 27 adapted to depend within coffee bag 9.

A second sight gage 30 is preferably arranged upon the exterior of the percolator and communicates with the outer chamber 1. Said sight gage may be provided with graduations 31 to measure the water level within the percolator, and a faucet 32 for withdrawing hot water is arranged at the lower end of the sight gage. The desired water level within the percolator may be maintained through a suitable supply pipe 34 preferably communicating with the lower portion of chamber 1 and provided with a suitable cut-off valve 35.

Valves 37 are provided in pipes 12 and 18 respectively adjacent the T 17, and said valves are opened and closed by operating handles 38 which preferably carry electrical contact makers 39 arranged to engage contacts 40 when the valves are opened. The circuits through contacts 39—40 form part of the circuit through motor 16 so as to cause actuation of the motor and operation of the pump whenever either valve 37 is opened.

In operation water having been placed in chambers 1 and 5 to a desired level, the valve for pipe 12 is closed and the valve for pipe 18 is opened. The pump will then cause circulation through pipe 18, the pump, pipe 19, the pipe 11, sight gage 22 and the coffee receptacle, and thence through pipe 10 and past the check valve 20 so as to complete the circulation of the water. The amount of water thus supplied to the coffee receptacle may be measured by the graduations upon sight gage 30 which will show a corresponding decrease in the water level within the outer chamber of the percolator.

When sufficient water has been introduced into the percolating system, the valve in pipe 18 is closed and the valve in pipe 12 is opened. As a result no more water will enter the percolating system, but the water in said system will be circulated through the coffee by the pump. This circulation of the water for percolating the coffee is by way of pipe 12, pump 15, pipe 19, pipe 11, sight gage 22 pipe 25, and thence through the coffee and the coffee receptacle back to pipe 10. It will also be noted that the circulation of the percolated coffee through sight gage 22 permits of visibly noting the condition of the coffee in order that it may be made of the required strength.

It will further be noted that the construction of the percolator, as above set forth, provides for withdrawing hot water from outer chamber 1 through faucet 32 as it is needed, while maintaining a volume of hot water within chamber 5 and surrounding the coffee receptacle.

Various changes may be made without departing from the spirit of the invention as claimed.

What is claimed is:

1. A percolator including an inner receptacle, a circulating system through said receptacle, means for pumping fluid through said circulating system, a motor for operating said pumping means, a closure valve in said circulating system, and controlling means for said motor and valve dependently operated.

2. A percolator comprising an inner receptacle, an outer chamber, a circulating system through said inner receptacle, said circulating system having an extension through said outer chamber, and independent valvular means in said circulating system and in said extension.

3. A percolator comprising an inner receptacle, an outer chamber, a circulating system through said inner receptacle, said circulating system having an extension through said outer chamber, a pump coöperating with said circulating system and with the extension thereof, means for operating said pump, and valvular means in said circulating system and in said extension, and each controlling the operating means for said pump.

4. A percolator comprising an inner receptacle, an outer chamber, a discharge conduit leading from the base of said reecptacle, a pump, inlets thereto from said receptacle and from said outer chamber, and a discharge from said pump to said discharge conduit, said conduit leading back to the top of said receptacle.

5. A percolator comprising an inner receptacle, an outer chamber, a discharge conduit leading from the base of said receptacle, a pump, inlets thereto from said receptacle and from said outer chamber, a discharge from said pump to said discharge conduit, said conduit leading back to the top of said receptacle, valvular controlling means in said pump inlets, and a check valve in said discharge conduit between the inner receptacle and said pump discharge.

6. A percolator including an inner receptacle, an intermediatae chamber surrounding the same, an outer chamber, a circulating system through said receptacle, said chambers communicating at their upper ends, and a fluid discharge and a fluid inlet for said outer chamber.

In testimony whereof I have signed my name to this specification.

ROY E. FARMER.